United States Patent
Havera

[15] 3,682,920
[45] Aug. 8, 1972

[54] (PHENYL PIPERAZYL ALKYL) 3,4-DIHYDROCARBOSTYRIL

[72] Inventor: Herbert John Havera, Edwardsburg, Mich.

[73] Assignee: Miles Laboratories, Inc., Elkhart, Ind.

[22] Filed: Nov. 9, 1970

[21] Appl. No.: 88,127

Related U.S. Application Data

[62] Division of Ser. No. 803,950, March 3, 1969, Pat. No. 3,629,266.

[52] U.S. Cl. ..........................260/268 BQ, 424/250
[51] Int. Cl. ...........................................C07d 51/70
[58] Field of Search ..............................260/268 BQ

[56] References Cited

UNITED STATES PATENTS

| | | | |
|---|---|---|---|
| 3,330,823 | 7/1967 | Bernstein | 260/268 BQ |
| 3,575,984 | 4/1971 | Plostmeks | 260/288 R |
| 3,629,266 | 12/1971 | Havera | 260/288 R |

*Primary Examiner*—Donald G. Daus
*Attorney*—Joseph C. Schwalbach, Michael A. Kondzella and Louis E. Davidson

[57] ABSTRACT

1-Substituted derivatives of 3,4-dihydrocarbostyril that are useful as analgesic agents. These compounds are prepared by reacting a 3,4-dihydrocarbostyril or substituted 3,4-dihydrocarbostyril with a suitable haloalkylamine.

7 Claims, No Drawings

(PHENYL PIPERAZYL ALKYL) 3,4-DIHYDROCARBOSTYRIL

This is a division of application Ser. No. 803,950 filed Mar. 3, 1969 now U.S. Pat. No. 3,629,266.

This invention relates to a novel series of chemical compounds having beneficial properties. More particularly, the invention relates to 1-substituted derivatives of 3,4-dihydrocarbo-styril which possess advantageous pharmacological characteristics.

Compounds of this invention may be represented by the general structural formula:

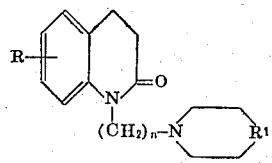

in which R is a member selected from the group consisting of H,

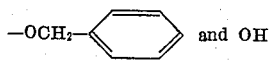 and OH $R_1$ is a member selected from the group consisting of

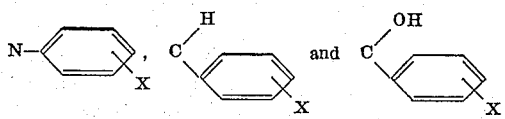

X is a member selected from the group consisting of H and a halogen, and $n$ is an integer between 1 and 5.

Compounds of this invention are conveniently prepared by forming a metal salt of 3,4-dihydrocarbostyril and then reacting that metal salt with a suitable haloalkylamine in the presence of a strong base. This reaction is preferably carried out in two steps in which the metal salt of the 3,4-dihydrocarbostyril is first prepared by heating to reflux 3,4-dihydrocarbostyril with a strong base such as sodium methoxide, sodium hydride, sodium amide, potassium hydride, potassium methoxide, and similar compounds or with a metal such as sodium. This reaction is advantageously carried out in the presence of a solvent that is inert under these reaction conditions and with reflux times that are sufficient to permit completion of the reaction. Similar reaction conditions are used for reacting the metal salt with the haloalkylamine.

The starting 3,4-dihydrocarbostyril may be substituted with previously described substituents, R, at the 5, 6, 7 or 8 positions prior to reaction with the haloalkylamine. These compounds are readily available and therefore the preparation of such substituted compounds will not be described herein.

A 5-, 6-, 7-, or 8-hydroxy substituted 3,4-dihydrocarbostyril compound of the invention may be prepared by using a starting compound that is substituted in a corresponding position with a suitable oxy radical, such as benzyloxy. The reaction product of the oxy substituted 3,4-dihydrocarbostyril and haloalkylamine may then be reduced or hydrogenated to form the desired hydroxy substituted compound. This reduction or hydrogenation is readily carried out according to accepted chemical procedures. Preparation of this hydroxy substituted compound will be described in the accompanying examples.

Preparation of compounds of this invention may be represented by the following equation:

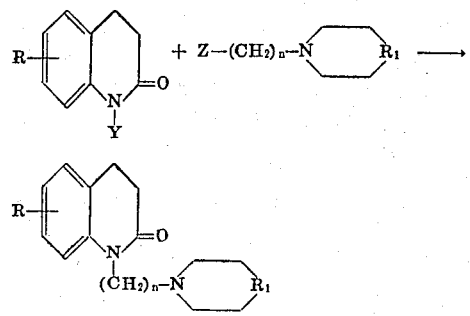

In the above reaction Y is a metal such as sodium or potassium and Z is a halogen.

A compound that is substituted at the 5-, 6-, 7- or 8- position with a hydroxy radical may be prepared according to the following equation in which a benzyloxy radical is used for illustrative purposes.

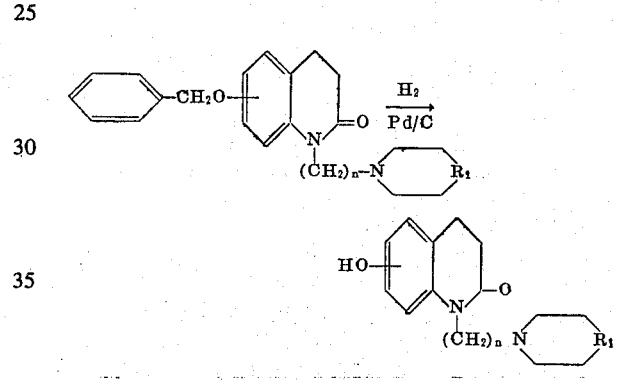

In preparing the hydroxy substituted compound, reduction of the benzyloxy compound is conveniently effected by the use of a palladium on charcoal catalyst, although other suitable catalyst may be used.

The novel compounds of this invention may be isolated as free bases and are preferably furnished as water-soluble acid addition salts. Beneficially, pharmacologically acceptable salts suitable for incorporation in medications are formed. Satisfactory nontoxic, water-soluble, acid addition salts may be formed from mineral acids such as halogen acids or sulfuric acid, or from organic acids such as citric acid, maleic acid, oxalic acid, and other similar acids. The preparation of these addition salts is described in the subsequent detailed examples and will not, therefore, be set forth at this point.

The compounds of this invention have demonstrated beneficial pharmacological properties. In particular, these compounds are useful as analgesic agents.

Medications may be conveniently prepared including at least one of the novel compounds of this invention as an active ingredient in the form of the free base or pharmacologically acceptable acid addition salt thereof. These medications may be beneficially prepared by combining the active ingredient with a pharmaceutical vehicle including components selected from the fillers, carriers, extenders, excipients, and the like generally used in pharmaceutical formulations. Medications may be prepared in the solid state as tablets, capsules or suppositories, or in the liquid state as solutions or suspensions. Dosage forms suitable for oral, subcutaneous, intraperitoneal, or other convenient means of administration may be provided. The pharmaceutical vehicle may also include common diluents or tableting adjuncts such as cellulose powder, cornstarch, lactose, talc and such, used according to accepted pharmaceutical manufacturing practices. Unit dosages (a specific weight, such as mg. or g.) of active ingredient in the medication may be varied so that an adequate amount is present to provide a desired thereapeutic dose without untoward side effects, as well as to permit satisfactory variation in doses administered. A dose is considered as a ratio of the weight of active ingredient administered to a patient's body weight, usually expressed as mg./kg.

The amount of active ingredient administered to a patient is advantageously between about 0.05 and 1.0 gram per day. This amount may be varied according to the desired therapeutic dose.

Analgesic activity was observed when medications including compounds of this invention as an active ingredient were administered to a group of test animals. Analgesic activity was determined according to a procedure substantially as described by Bianchi, C. and Franceschini, J., in "Experimental Observations on Haffner's Method for Testing Analgesic Drugs", Brit. J. Pharmacol., 9:280 (1954).

Medications including compounds of this invention elicited analgesic activity when administered subcutaneously and intraperitoneally to separate groups of 20 mice. A definite increase in the threshold of pain perception was evident at doses of 25 to 100 mg./kg. of active ingredient. With such medications, from 5 to 75 percent of the mice showed analgesia, in comparison with untreated groups.

Compounds of the invention also antagonized the stimulant action of histamine and serotonin. Additionally, antiadrenergic properties were found for active ingredients selected from compounds of this invention.

Toxicity of these novel compounds is low. An $LD_{50}$ between 68 and 464 mg./kg. was noted in mice when these medications were administered intraperitoneally.

This invention will be further understood by reference to the following examples which describe specific compounds of the invention and the process for the preparation thereof. These examples are representative of some of the novel compounds of the invention and are not intended to limit the scope of the invention as defined in the appended claims.

EXAMPLE 1

1-[2-(4-Hydroxy-4-phenyl-1-piperidyl)ethyl]-3,4-dihydrocarbostyril, semioxalate.

To 15.0 g. (0.1 mole) of 3,4-dihydrocarbostyril in 100 ml. of dry xylene 5.0 g. of sodium hydride was carefully added with stirring. After the addition was complete, the reaction mixture was heated to reflux with stirring for 4 hours. The solution was cooled and 5.0 g. of sodium hydride added carefully. To the above solution 15.0 g. of 4-phenyl-4-hydroxy-1-(2-chloroethyl)piperidine hydrobromide was added. The reaction mixture was heated to reflux. An additional 15.0 g. (0.094 mole total) of 4-phenyl-4-hydroxy-1-(2-chloroethyl)piperidine hydrobromide was added and the mixture was heated to reflux with stirring for 4 hours. The solution was cooled and water added to dissolve inorganic material. Chloroform was also added and the organic layer separated from the aqueous layer. The organic layer was washed with water and dried over $MgSO_4$. The organic solvents were concentrated in vacuo leaving an oily residue which would not crystalize. The starting 3,4-dihydrocarbostyril was removed by distillation boiling at 160°–164°C. at 0.3 mm. The residue was dissolved in methanol, $\nu_{max}^{CHCl_3}$ 1,660 cm$^{-1}$ (amide carbonyl), 3,600 cm$^{-1}$ (free —OH) 3,400 cm$^{-1}$ (associated —OH). The oxalate was prepared by adding 5.4 g. (0.06 mole) of oxalic acid to the 21.0 g. (0.06 mole) of free base. A solid immediately precipitated upon addition of ether. The solid was recrystallized from a mixture of methanol, water, and DMF. Yield 5.0 g., m.p. 237°–238°C.

Anal. Calcd. for $C_{23}H_{27}N_2O_4$: C, 69.84; H, 6.89; N, 7.08.

Found: C, 69.62; H, 6.77; N, 7.14.

EXAMPLE 2

1-[3-(4-Phenyl-1-piperazyl)propyl]-3,4-dihydrocarbostyril oxalate.

To 20 g. (0.13 mole) of 3,4-dihydrocarbostyril in 200 ml. of dry xylene was added 7.2 g. (0.3 mole) of a sodium hydride suspension and the mixture was heated to reflux with stirring for 5 hours. The solution was cooled and 31 g. (0.13 mole) of 4-phenyl-1-(3-chloropropyl)piperazine in 50 ml. of xylene was added dropwise. After the addition was complete the mixture was heated to reflux with stirring for 15 hours. The solution obtained an orange color during the heating. The mixture was cooled and water was added to remove any inorganic material. Chloroform was added to the mixture and the organic layer separated from the aqueous layer. The xylene and chloroform were removed in vacuo and an oily residue remained which weighed 43 g. The oxalate salt was made by adding 10.8 g. (0.12 mold) of oxalic acid to the oil in a solution of methanol. A solid immediately formed which was filtered and recrystallized from a solution of 2-propanol, water and ether with charcoal; yield 21 g., m.p. 210°–211°C.

Anal. Calcd. for $C_{24}H_{29}N_3O_5$: N (basic), 3.19; N (total), 9.57.

Found: N (basic), 3.22; N (total), 9.55.

EXAMPLE 3

1-[3-(4-m-Chlorophenyl-1-piperazyl)propyl]-3,4-dihydrocarbostyril, maleate.

To 250 ml. of warm xylene 1.69 g. of sodium was added and the mixture was heated to reflux with stirring for one-half hour. To this solution 10.2 g. (0.07 mole) of 3,4-dihydrocarbostyril was added and the mixture was heated to reflux with stirring for 2 hours. To the reaction mixture 19.3 g. (0.07 mole) of 4-m-chlorophenyl-1-(3-chloropropyl)piperazine was added and the solution was heated to reflux with stirring for another 15 hours. The mixture was filtered while hot to remove inorganic material and the filtrate concentrated in vacuo. An oily residue was obtained which weighted 13.1 g. The maleate salt was prepared by adding 4.64 g. (0.04 mole) of maleic acid in methanol to the free base. A solid material was obtained which was recrystallized from 2-propanol using charcoal, and then once from 2-propanol, ethyl acetate, and ether. Yield 7.0 g., m. p. 137°–139°C.

Anal. Calcd. for $C_{26}H_{30}ClN_3O_5$: N (total), 8.40; N (basic), 2.80.

Found: N (total), 8.45; N (basic), 2.86.

EXAMPLE 4

1-[3-(4-Phenyl-1-piperazyl)propyl]-6-benzyloxy-3,4-dihydrocarbostyril, oxalate.

To 10.0 g. (0.04 mole) of 6-benzyloxy-3,4-dihydrocarbostyril in 100 ml. of xylene was added 2.0 g. (0.04 mole) of sodium hydride and the reaction mixture was heated to reflux with stirring for 4 hours. To the above solution 9.5 g. (0.04 mole) of 4-phenyl-1-(3-chloropropyl)piperazine was added and the reaction mixture heated to reflux for an additional 4 hours. The mixture was cooled and water added to dissolve inorganic material. The organic layer was separated, washed, and dried over magnesium sulfate. The xylene was removed in vacuo leaving an oily residue which would not crystallize. The oxalate was made by adding 3.15 g. (0.035 mole) of oxalic acid to the 16.0 g. of free base. A solid formed immediately which was filtered and recrystallized three times from a methanol-ether mixture. Yield 8.0 g., m.p. 185°–186°C.

Anal. Calcd. for $C_{31}H_{35}N_3O_6$: N (total), 7.71; N (basic), 5.14.

Found: N (total), 7.67; N (basic), 5.15.

EXAMPLE 5

1-[3-(4-Phenyl 1-piperazyl)propyl]-6-hydroxy-3,4-dihydrocarbostyril, oxalate.

To 11.5 g. (0.045 mole) of 6-benzyloxy-3,4-dihydrocarbostyril in 100 ml. of xylene was added 2.5 g. (0.05 mole) of sodium hydride and the reaction mixture was heated to reflux with stirring for 4 hours. To the above solution 10.7 g (0.04 mole) of 4-phenyl-1-(3-chloropropyl)piperazine was added and the reaction mixture was heated to reflux for an additional 4 hours. The mixture was cooled and water was added to dissolve the inorganic material. The organic layer was separated, washed and dried over magnesium sulfate. The xylene was removed in vacuo leaving an oily residue which would not crystallize. An oil (20 g.) was obtained which was submitted for debenzylation. To the free base in 100 ml. of absolute ethanol 5 g. of 5 percent palladium on charcoal was added. The sample was placed in a hydrogenation flask at 50 lbs./in²for 12 hours. Fifteen lbs. of hydrogen were taken up theroretical 16 lbs/in².). The solution was filtered and the ethanol removed in vacuo leaving another viscous oil. To 16.0 g. (0.044 mole) of the free base 3.9 g. (0.044 mole) of oxalic acid in methanol was added and the mixture heated on a steam bath for 10 minutes. The solution was cooled and a precipitate formed which was filtered and recrystallized from a methanol, DMF and water mixture 3 times. Yield, 10.0 g., m.p. 345°–346°C.

Anal. Calcd. For $C_{24}H_{29}N_3O_6$: N (total), 9.24; N (basic), 3.08.

Found: N (total), 9.30; N (basic), 3.09.

EXAMPLE 6

1-[3-(4-p-Fluorophenyl-1-piperazyl)propyl]-7-benzyloxy-3,4-dihydrocarbostyril

To 25.0 g. (0.10 mole) of 7-benzyloxy-3,4-dihydrocarbostyril in 100 ml. of xylene 5.5 g. of sodium hydride was added with stirring. The reaction mixture was heated to reflux with stirring for 4 hours. The solution was cooled and 26.7 g. (0.10 mole) of 1-(3-chloropropyl)-4-(p-fluorophenyl)piperazine in 50 ml. of xylene added. The reaction mixture was heated to reflux with stirring for 4 more hours. The solution was again cooled and water was added to dissolve inorganic material. The organic layer was separated, washed with water and dried over MgSO$_4$. The xylene was concentrated in vacuo leaving an oil which solidified. The brown solid was filtered and recrystallized from methanol two times. Yield 25.0 g., m.p. 109°–111°C.

Anal. Calcd. for $C_{29}H_{32}FN_3O_2$: N (total), 8.87.

Found: N (total), 8.61.

1-[3-(4-p-Fluorophenyl-1-piperazyl)propyl]-7-benzyloxy-3,4-dihydrocarbostyril, oxalate.

To 10.0 g. (0.02 mole) of the free base 1.8 g. (0.02 mole) of oxalic acid was added. A solid material formed almost immediately and was recrystallized two times from a methanol, ether mixture. Yield 6.0 g., m.p. 163°–164°C.

Anal. Calcd. for $C_{31}H_{34}FN_3O_6$: N (total), 7.46; N (basic), 2.46.

Found: N (total), 7.40; N (basic), 2.45.

EXAMPLE 7

1-[3-(4-p-Fluorophenyl-1-piperazyl)propyl]-7-hydroxy-3,4-dihydrocarbostyril, semioxalate.

To 15.0 g. (0.032 mole) of 1-[3-(4-p-fluorophenyl-1-piperazyl)propyl]-7-benzyloxy-3,4-dihydrocarbostyril in 200 ml. of absolute ethanol 2.5 g. of 10 percent palladium on charcoal was added and the mixture hydrogenated at 50 lbs. of pressure for 2 hours. A total of 10 lbs. of hydrogen were taken up. The solution was filtered to remove the catalyst and the filtrate concentrated in vacuo leaving an oil. $\nu_{max}^{CHCl_3}$ 3,600 cm$^{-1}$ (free —OH), 3,300 cm$^{-1}$ (associated —OH). The oxalate salt was prepared by adding 3.0 g. (0.34 mole) of oxalic acid to 13.0 g. (0.034 mole) of the free base. A solid material was obtained which was recrystallized from a methanol, ether mixture. Yield 5.0 g., m.p. 209°–210°C.

Anal. Calcd. for $C_{23}H_{27}FN_3O_4$: C, 64.45; H, , 6.35; N (total), 9.82.

Found: C, 63.65; H, 6.14; N (total), 9.74.

What is claimed is:

1. A compound selected from the group consisting of compounds of the formula:

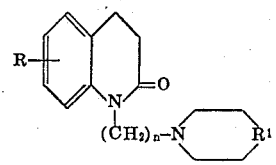

in which R is a member selected from the group consisting of H,

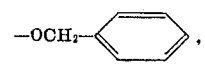

and OH, R₁ is

X is a member selected from the group consisting of H and a halogen, and *n* is an integer between 1 and 5, and pharmacologically acceptable salts thereof.

2. A compound according to claim 1 which is 1-[3-(4-phenyl-1-piperazyl)propyl]-3,4-dihydrocarbostyril.

3. A compound according to claim 1 which is 1-[3-(4-m-chlorphenyl-1-piperazyl)propyl]-3,4-dihydrocarbostyril.

4. A compound according to claim 1 which is 1-[3-(4-phenyl-1-piperazyl)propyl]-6-benzyloxy-3,4-dihydrocarbostyril.

5. A compound according to claim 1 which is 1-[3-(4-phenyl-1-piperazyl)propyl]-6-hydroxy-3,4-dihydrocarbostyril.

6. A compound according of claim 1 which is 1-[3-(4p-fluorophenyl-1-piperazyl)-propyl]-7-benzyloxy-3,4-dihydrocarbostyril.

7. A compound according of claim 1 which is 1-[3-(4-p-fluorophenyl-1-piperazyl)propyl]-7-hydroxy-3,4-dihydrocarbostyril.

* * * * *